(12) United States Patent
Jaussi et al.

(10) Patent No.: US 9,654,342 B2
(45) Date of Patent: May 16, 2017

(54) BANDWIDTH CONFIGURABLE IO CONNECTOR

(75) Inventors: James E. Jaussi, Hillsboro, OR (US); Stephen R. Mooney, Mapleton, UT (US); Bryan K. Casper, Portland, OR (US); Howard L. Heck, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,590

(22) PCT Filed: Sep. 30, 2011

(86) PCT No.: PCT/US2011/054452
§ 371 (c)(1),
(2), (4) Date: Mar. 24, 2014

(87) PCT Pub. No.: WO2013/048508
PCT Pub. Date: Apr. 4, 2013

(65) Prior Publication Data
US 2014/0237142 A1    Aug. 21, 2014

(51) Int. Cl.
*G06F 3/00*    (2006.01)
*H04L 12/24*    (2006.01)
*G06F 13/38*    (2006.01)

(52) U.S. Cl.
CPC ........ *H04L 41/0896* (2013.01); *G06F 13/385* (2013.01); *Y02B 60/1228* (2013.01); *Y02B 60/1235* (2013.01)

(58) Field of Classification Search
CPC .................................................. G06F 13/1657
See application file for complete search history.

(56) References Cited

U.S. PATENT DOCUMENTS

| | | |
|---|---|---|
| 6,175,434 B1 | 1/2001 | Feng |
| 7,596,675 B2 * | 9/2009 | Jobs et al. ............... 711/170 |
| 8,160,451 B2 * | 4/2012 | Liu et al. ............... 398/138 |

(Continued)

FOREIGN PATENT DOCUMENTS

| | | |
|---|---|---|
| CN | 1950810 A | 4/2007 |
| CN | 1967515 A | 5/2007 |
| CN | 101122894 A | 2/2008 |
| WO | 2013/048508 A1 | 4/2013 |

OTHER PUBLICATIONS

International Search Report and Written Opinion received for PCT Application No. PCT/US2011/054452, mailed on May 21, 2012, 8 pages.

(Continued)

*Primary Examiner* — Henry Tsai
*Assistant Examiner* — Juanito Borromeo
(74) *Attorney, Agent, or Firm* — Jordan IP Law, LLC

(57) ABSTRACT

Systems and methods of interconnecting devices may include an input/output (IO) interface having one or more device-side data lanes and transceiver logic to receive a bandwidth configuration command. The transceiver logic may also configure a transmit bandwidth of the one or more device-side data lanes based on the bandwidth configuration command. Additionally, the transceiver logic can configure a receive bandwidth of the one or more device-side data lanes based on the bandwidth configuration command.

37 Claims, 3 Drawing Sheets

(56) References Cited

U.S. PATENT DOCUMENTS

| | | | |
|---|---|---|---|
| 2003/0069972 A1* | 4/2003 | Yoshimura et al. | 709/226 |
| 2005/0099492 A1 | 5/2005 | Orr | |
| 2005/0277337 A1 | 12/2005 | Chen et al. | |
| 2008/0193140 A1 | 8/2008 | Liu et al. | |
| 2008/0313381 A1* | 12/2008 | Leigh et al. | 710/313 |
| 2009/0023475 A1* | 1/2009 | Chang | H04M 1/72527 455/557 |
| 2010/0064010 A1 | 3/2010 | Alkov et al. | |
| 2011/0093633 A1 | 4/2011 | Solomon et al. | |

OTHER PUBLICATIONS

International Preliminary Report on Patentability and Written Opinion received for PCT Patent Application No. PCT/US2011/054452, mailed on Apr. 10, 2014, 5 pages.

Office Action received for Korean Patent Application No. 2014-7008231, mailed Sep. 23, 2015, 7 pages including 3 pages of English translation.

Office Action received for Korean Patent Application No. 2014-7008231, mailed Mar. 25, 2015, 6 pages including 3 pages of English translation.

International Preliminary Report on Patentability for PCT Application No. PCT/US2011/054488, dated Jul. 18, 2013, 8 pages.

Office Action received for Korean Patent Application No. 2014-7008231, mailed Mar. 30, 2016, 8 pages including 4 pages of English translation.

Notice of Allowance for Korean Patent Application No. 10-2014-7008231, mailed on Aug. 25, 2016, 3 pages including 1 page of English translation.

Office Action for Korean Patent Application No. 10-2015-7013869, mailed on Jan. 3, 2017, 5 pages including 2 page of English translation.

* cited by examiner

BANDWIDTH CONFIGURABLE IO CONNECTOR

BACKGROUND

Technical Field

Embodiments generally relate to input/output (IO) interfaces. More particularly, embodiments relate to an IO connector having transceiver logic that dynamically reconfigures the upstream and downstream bandwidth of the IO connector.

Discussion

Computing systems may include one or more USB (Universal Serial Bus, e.g., USB Specification 3.0, Rev. 1.0, Nov. 12, 2008, USB Implementers Forum) ports to support IO communication with peripheral components such as keyboards, mice, cameras, and so forth. A typical USB port may be limited, however, to a certain bandwidth due to connector and internal host interconnect constraints.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an input/output (IO) connector having one or more device-side data lanes and transceiver logic to receive a bandwidth configuration command. The transceiver logic may also configure a transmit bandwidth of the one or more device-side data lanes based on the bandwidth configuration command. In addition, the transceiver logic can configure a receive bandwidth of the one or more device-side data lanes based on the bandwidth configuration command.

Embodiments can also include a host device to generate a bandwidth configuration command, and an IO connector having one or more device-side data lanes and transceiver logic to receive the bandwidth configuration command. The transceiver logic may configure a transmit bandwidth of the one or more device-side data lanes based on the bandwidth configuration command, and configure a receive bandwidth of the one or more device-side data lanes based on the bandwidth configuration command.

Other embodiments may involve a computer implemented method in which a bandwidth configuration command is issued to an IO connector including one or more device-side data lanes. A transmit bandwidth of the one or more device-side data lanes may be configured based on the bandwidth configuration command. The method may also provide for configuring a receive bandwidth of the one or more device-side data lanes based on the configuration command.

Figure 1:
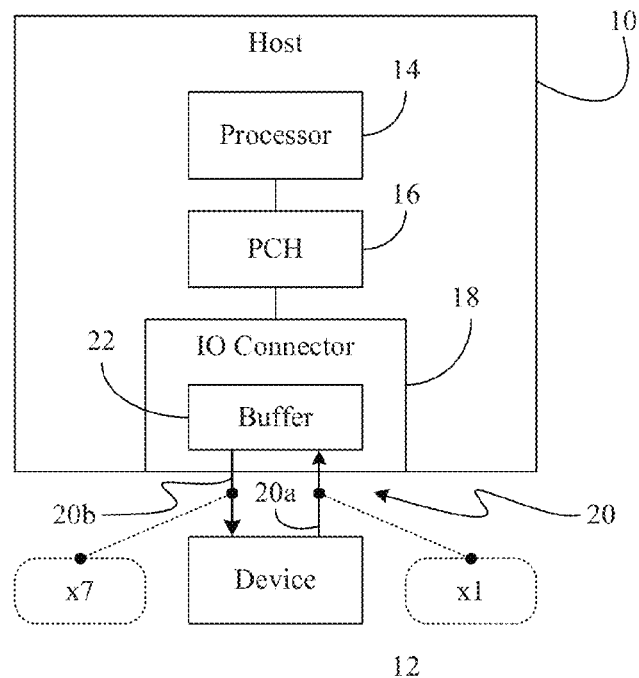
FIG. 1 is a block diagram of an example of an asymmetric bandwidth connection between a host platform and a peripheral device according to an embodiment.

Turning now to FIG. 1 an asymmetric connection is shown between a host platform 10 and a peripheral device 12. The host platform 10 may include, for example, a personal digital assistant (PDA), mobile Internet device (MID), wireless smart phone, media player, imaging device, smart tablet, laptop, desktop personal computer (PC), server, etc., or any combination thereof. Thus, the host platform 10 might include a chipset component such as a processor 14 and/or a platform controller hub (PCH) 16 configured to interact with a user of the platform 10 and control various hardware and software related functions of the platform 10. In addition, the peripheral device 14 could include, for example, a keyboard, mouse, camera, PDA, MID, wireless smart phone, media player, imaging device, smart tablet, external hard drive, etc., or any combination thereof.

The illustrated host platform 10 also includes an IO connector 18 having a buffer (e.g., silicon die, semiconductor package) 22 and plurality of device-side data lanes 20 (20a, 20b), wherein the peripheral device 12 may include a corresponding IO connector (not shown) that can be mated with (e.g., plugged into) the IO connector 18 of the host platform 10. In general, the buffer 22 may include transceiver logic (not shown) to dynamically configure the transmit (TX) bandwidth and the receive (RX) bandwidth of the device-side data lanes 20 based on system and/or user related considerations. For example, the illustrated device-side data lanes 20 include eight total lanes, wherein a first set of device-side data lanes 20a has a single (x1) lane configured to receive data from the peripheral device 12 and a second set of device-side data lanes 20b has seven (x7) lanes configured to transmit data to the peripheral device 12. Thus, the connection may be considered asymmetric in the sense that the downlink (e.g., host-to-device) data rate is different from the uplink (e.g., device-to-host) data rate.

The illustrated example may be advantageous for instances in which a relatively large amount of data is being transferred from the host platform 10 to the peripheral device 12, such as in the case of a media content download to a handheld media player or in the case of a large data backup to an external hard drive. By contrast, the device-side data lanes 20 could alternatively be configured so that the receive bandwidth is greater than the transmit bandwidth (e.g., system restore from external hard drive), or so that the receive bandwidth is equal to the transmit bandwidth. Thus, valid RX:TX port configurations for an eight lane architecture could include 0:8, 1:7, 2:6, 3:5, 4:4, 5:3, etc. The configuration of the transmit and receive bandwidths may be conducted in response to system and/or user related considerations. For example, the processor 14 and/or PCH 16 of the illustrated host platform 10 may obtain/identify user input as to the desired downlink and uplink data rates or usage model (e.g., media download, external drive restore), and issue a bandwidth configuration command to the IO connector 18 based on the user input. Indeed, the host devices could detect a user request to transfer a relatively large amount of data to or from the peripheral device 12, and automatically increase the bandwidth in either direction without an explicit user request for more bandwidth across the link.

Figure 2:
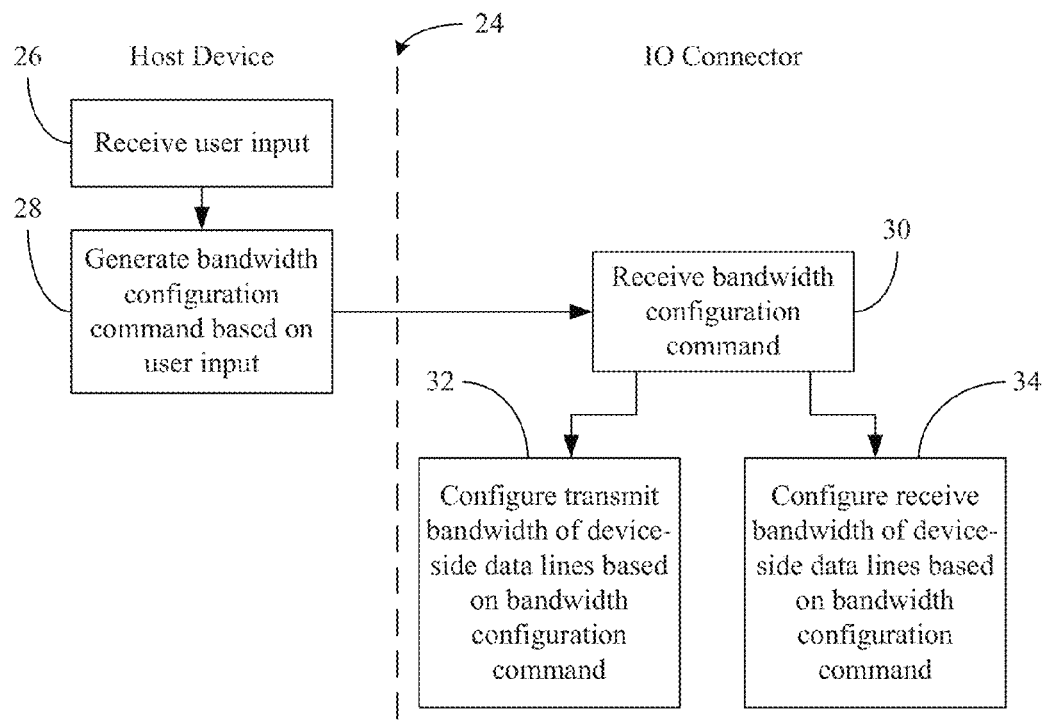
FIG. 2 is a flowchart of an example of a method of configuring a connection between a host platform and a device according to an embodiment.

FIG. 2 shows a method 24 of configuring a connection between a host platform and a peripheral device. The method 24 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASC), CMOS or transistor-transistor logic (TTL) technology, or any combination thereof. For example, computer program code to carry out operations shown in the method 24 may be written in any combination of one or more programming languages, including an object oriented programming language such as C++ or the like and conventional procedural programming languages, such as the "C" programming language or similar programming languages. Moreover, the method 24 could be implemented using any of the aforementioned circuit technologies.

Processing block 26 provides for receiving user input, wherein the user input might be obtained through a graphical user interface (GUI) or other suitable system component (e.g., keyboard, keypad, touch screen, microphone). As already noted, the user input may indicate that the user has requested a certain downlink and/or uplink data rate, a certain usage model, and so forth. The host device could also negotiate the lane width and/or direction with the peripheral device. In such a case, one or more lane width negotiation messages might be exchanged between the host platform and the peripheral device via the IO connector. A bandwidth configuration command may be generated at block 28 based on the user input and issued to the transceiver logic of the IO connector. Illustrated block 30 receives the bandwidth configuration command, wherein the bandwidth configuration command may be used to configure the bandwidth of the device-side data lanes. In particular, the transmit bandwidth of one or more device-side data lanes may be configured at block 32 based on the bandwidth configuration command, whereas block 34 may configure the receive bandwidth of the device-side data lanes based on the bandwidth configuration command.

Figure 3:
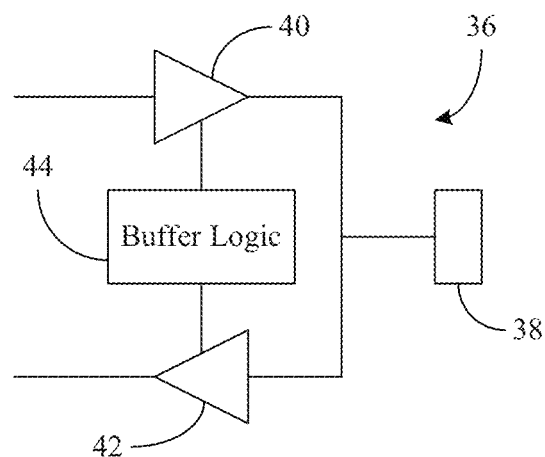
FIG. 3 is a block diagram of example of a device-side data lane according to an embodiment.

FIG. 3 shows an example of a device-side data lane 36 that includes an IO contact (e.g., pin, pad, slot) 38, a transmitter 40 coupled to the IO contact 38, and a receiver 42 coupled to the IO contact 38. The data lane 36, which may be readily substituted for any of the device-side data lanes 20 (FIG. 1), could employ differential signaling (e.g., two conductors) or single-ended signaling (e.g., one conductor), depending upon the circumstances. Moreover, the illustrated data lane 36 can include other transmitting and/or receiving components such as coding, decoding, modulation, demodulation units (not shown), and so forth. The transmitter 40 and the receiver 42 of the data lane 36 may also be coupled to logic (e.g., transceiver logic) 44 of a buffer such as buffer 22 (FIG. 1), wherein the logic 44 can configure the data lane 36 as either a transmit lane or a receive lane. For example, the logic 44 might selectively activate the transmitter 40 and deactivate the receiver 42 to configure the data lane 36 as a transmit lane. Similarly, the logic 44 could selectively deactivate the transmitter 40 and activate the receiver 42 to configure the data lane as a receive lane.

Alternatively, the logic 44 could leave both the transmitter 40 and the receiver 42 active and selectively negate one or more signal waves associated with the transmitter 40 and/or the receiver 42. Such an approach may be considered a form of simultaneous bi-directional signaling. For example, if the data lane 36 is to be configured as a transmit lane, the logic 44 might provide for subtracting any uplink signal waves received at the IO contact 38 from the total energy of the data lane 36 to effectively negate any waves that would otherwise be picked up by the receiver 42. Similarly, if the data lane 36 is to be configured as a receive lane, the logic 44 may provide for subtracting any downlink signal waves from the total energy of the data lane 36 to effectively negate the waves associated with the transmitter 40. Other techniques to configuring the direction of the data lane 36 may also be used.

Simply put, a number of possible transceiver configurations might be achieved during operation: 1) unidirectional, 2) bi-directional and 3) simultaneous bi-directional. In the unidirectional case, a transmitter may always be a transmitter and a receiver may always be a receiver. In the bi-directional case, a data lane can be configured to be either an RX or TX at each side of the link. For simultaneous bi-directional configurations, both transmitters and receivers may share the same contacts and use them at the same time.

Figure 4:
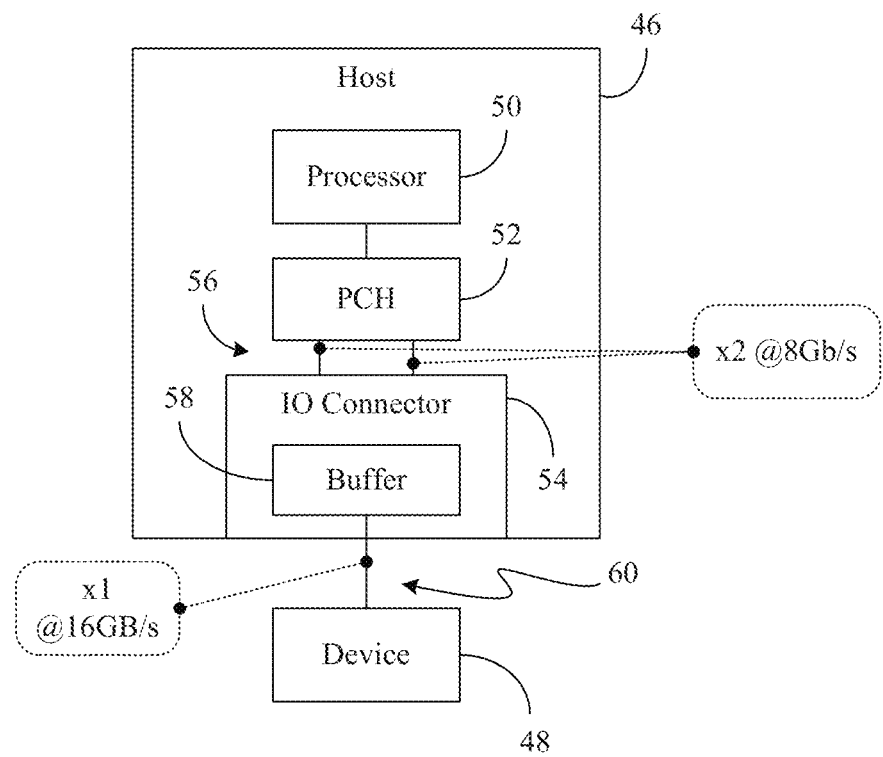
FIG. 4 is a block diagram of an example of a serialized connection between a host platform and a peripheral device according to an embodiment.

FIG. 4 shows a serialized connection between a host platform 46 and a peripheral device 48. In particular, the illustrated host platform has a processor 50 coupled to a PCH 52, which in turn has a connection 56 to an IO connector 54 that is two (x2) host-side data lanes wide. Each of the host-side data lanes of the connection 56 operates at a data rate of 8 GB/s in the illustrated example, wherein the IO connector 54 has a buffer 58 that communicates with the peripheral device 48 via a single (x1) device-side data lane 60. Thus, in the example shown, fewer device-side data lanes have been configured for operation than host-side data lanes. In order to match the device-side data rate to the host-side data rate, the illustrated transceiver logic of the buffer 58 configures the device-side data lane 60 to exchange data with the peripheral device at 16 GB/s. In particular, the transceiver logic of the buffer 58 may serialize data received on the host-side data lanes of the connection 56, and increase the data rate of the serialized data prior to transmission on the device-side lane 60. Similarly, the transceiver logic of the buffer 58 may deserialize data received on the device-side data lane 60 and decrease the data rate of the deserialized data prior to transmission on the host-side lanes of the connection 56. The illustrated approach may therefore enable the IO connector 54 to dynamically adapt to data rate mismatches between host platforms and peripheral devices as well as achieve increased data rates.

Figure 5:
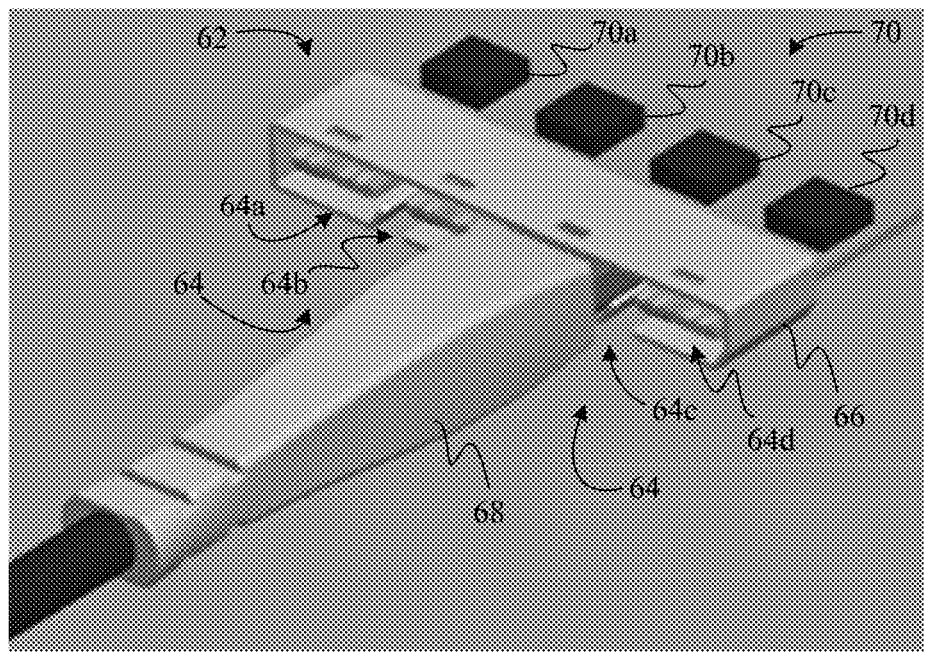
FIG. 5 is a perspective view of an example of an input/output (IO) connector having a plurality of bays according to an embodiment.

Turning now to FIG. 5, an IO connector 62 having a plurality of bays 64 (64*a*-64*d*) positioned side-by-side within a shared housing is shown. Each bay 64 has a set of device-side data lines that may be coupled to a peripheral device (not shown) if a corresponding connector, such as connector 68, of the peripheral device is mated with the bay 64 in question. Each illustrated bay 64 also has an associated buffer 70 (70*a*-70*b*), that is capable of dynamically configuring the transmit bandwidth and receive bandwidth of the corresponding bay 64. An alternative configuration might include a single semiconductor package/silicon chip with a shared buffer that configures the transmit and receive bandwidth of all bays 64. As will be discussed, multiple peripheral devices may be connected to a host platform via the IO connector 62.

The IO connector 62 may incorporate, for example, USB technology, DisplayPort (DP, e.g., Embedded DisplayPort Standard (eDP) Version 1.3, January 2011, Video Electronics Standards Association) technology, High-Definition Multimedia Interface (HDMI, e.g., HDMI Specification, Ver. 1.3a, Nov. 10, 2006, HDMI Licensing, LLC) technology, Thunderbolt (e.g., Thunderbolt™ Technology: The Transformational PC I/O, 2011, Intel Corporation) technology, Peripheral Components Interconnect Express (PCI-e e.g., PCI Express x16 Graphics 150W-ATX Specification 1.0, PCI Special Interest Group) technology, and so forth.

Figure 6:
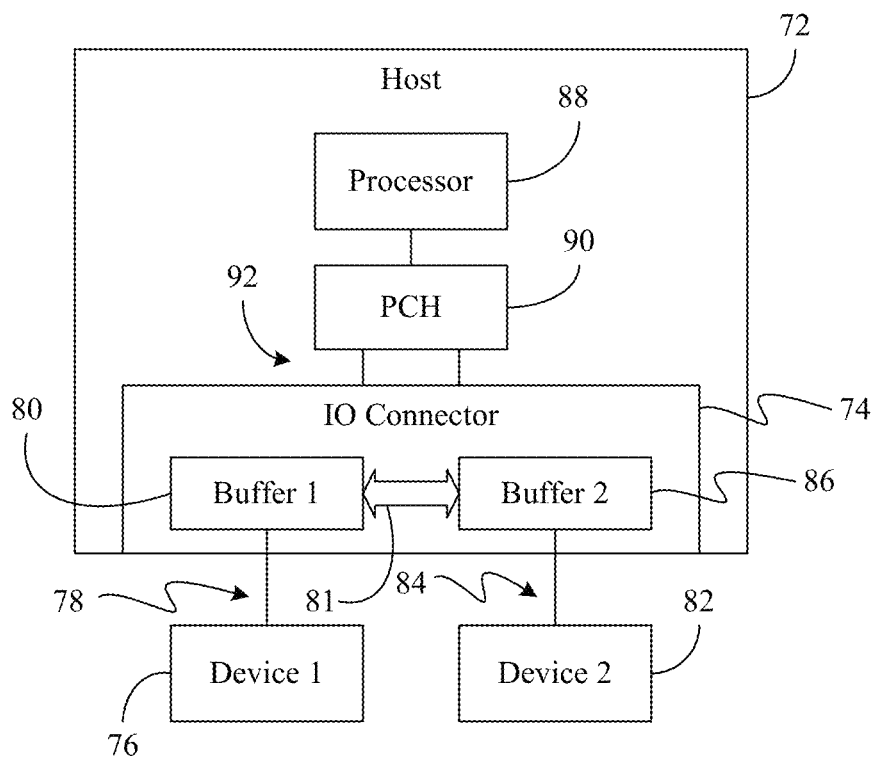
FIG. 6 is a block diagram of an example of an architecture in which data is transferred directly between peripheral devices coupled to an IO connector.

FIG. 6 shows a scenario in which a host platform 72 includes an IO connector 74 with two active bays. In the illustrated example, a first peripheral device 76 is connected to the device-side data lanes 78 of a first buffer 80, and a second peripheral device 82 is coupled to the device-side data lanes 84 of a second buffer 86. The first buffer 80 may communicate with the second buffer 86 in order to route data directly between their corresponding bays and the devices 76, 82. Moreover, the routing of data directly between the devices 76, 82 may be accomplished without involving host-side data lanes 92, or the chipset components of the host platform 72 such as a processor 88 or PCH 90.

For example, the devices 76, 82 could be external hard drives, wherein a large amount of data is to be transferred between the drives. In such a case, the data may be transferred in a manner that bypasses the host devices altogether and reduces the amount of energy required to operate the platform 72. Moreover, the link 81 between the buffers 80, 86, might be implemented by single-ended signaling due to the short distance between the buffers 80, 86. Indeed, if the buffers 80, 86 are incorporated onto a single silicon die, the link 81 may be virtual.

Thus, techniques described herein leverage a unique silicon buffer and the scaling potential of IO cabling to enable substantial scalability improvements. Moreover, the use of asymmetric bandwidth over IO data lines may provide substantially more flexibility and functionality to host platform-peripheral device configurations, which can vary from one usage model to another. Additionally, facilitating direct communication between peripheral devices can free up valuable host processing resources and may prevent saturation of the link to the host devices. Additionally, power management advantages can be achieved by configuring device-side data lanes into a burst-sleep-burst mode in which all lanes are temporarily converted to transmit lanes. Power consumption may also be reduced by selectively deactivating host-side data lanes during periods of idleness and/or low IO activity.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and curly no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
   a host device to generate a bandwidth configuration command between a mobile host platform having a host-side data rate and a peripheral device having a device-side data rate, wherein the bandwidth configuration command is generated based at least on user input including a request to transfer data; and
   an input/output (IO) connector in communication with the peripheral device, the IO connector including one or more device-side data lanes to define a transmit bandwidth and a receive bandwidth between the mobile host platform and the peripheral device based on the bandwidth configuration command received from the host device, wherein the bandwidth configuration command includes a negotiated lane width and direction between the mobile host platform and the peripheral device, and transceiver logic to,
   receive the bandwidth configuration command,
   dynamically configure the transmit bandwidth of the one or more device-side data lanes based on the bandwidth configuration command, and
   dynamically configure the receive bandwidth of the one or more device-side data lanes based on the bandwidth configuration command,
   wherein the bandwidth configuration command is to match the host-side data rate and the device-side data rate, and to automatically increase the bandwidth in either direction without an explicit request for more bandwidth.

2. The system of claim 1, wherein each of the one or more device-side data lanes includes:

one or more IO contacts;
a transmitter coupled to the one or more IO contacts; and
a receiver coupled to the one or more IO contacts.

3. The system of claim 2, wherein the transceiver logic is to selectively activate at least one of the transmitter and the receiver based on the bandwidth configuration command.

4. The system of claim 2, wherein the transceiver logic is to selectively negate one or more signal waves associated with at least one of the transmitter and the receiver based on the bandwidth configuration command.

5. The system of claim 1, further including one or more host-side data lanes having a host-side data rate, wherein the transceiver logic is to match a device-side data rate of the one or more device-side data lanes to the host-side data rate.

6. The system of claim 5, wherein the transceiver logic is to,
configure fewer device-side data lanes for operation than host-side data lanes,
serialize data received on the host-side data lanes,
increase a data rate of the serialized data,
deserialize data received on the device-side data lanes, and
decrease a data rate of the deserialized data.

7. The system of claim 6, wherein the transceiver logic is to configure a single device-side data lane for operation.

8. The system of claim 1, wherein the IO connector further includes a plurality of bays, each bay includes one or more device-side data lanes and the logic is to route data directly between two or more of the plurality of bays.

9. The system of claim 1, wherein the transceiver logic is to configure the transmit bandwidth to be greater than the receive bandwidth.

10. The system of claim 1, wherein the transceiver logic is to configure the receive bandwidth to be greater than the transmit bandwidth.

11. The system of claim 1, wherein the transceiver logic is to configure the receive bandwidth to be equal to the transmit bandwidth.

12. The system of claim 1, wherein the host device is to identify user input, and wherein the bandwidth configuration command is to be generated based on the user input.

13. The system of claim 1, wherein the IO connector further includes:
a housing;
a semiconductor package, wherein the semiconductor package includes the transceiver logic; and
a substrate coupled to the semiconductor package, wherein the substrate includes the device-side data lanes, and the device-side data lanes are disposed within the housing.

14. The system of claim 1, wherein the host device is to issue a lane width negotiation message to the IO connector, the IO connector is to transmit the lane width negotiation message via at least one of the device-side data lanes.

15. An input/output (IO) connector comprising:
one or more device-side data lanes to communicate with a peripheral device and to define a transmit bandwidth and a receive bandwidth between a mobile host platform having a host-side data rate and the peripheral device having a device-side data rate; and
transceiver logic to,
receive a bandwidth configuration command, wherein the bandwidth configuration command includes a negotiated lane width and direction between the mobile host platform and the peripheral device,
dynamically configure the transmit bandwidth of the one or more device-side data lanes based on the bandwidth configuration command, and
dynamically configure the receive bandwidth of the one or more device-side data lanes based on the bandwidth configuration command,
wherein the bandwidth configuration command is to match the host-side data rate and the device-side data rate, and to automatically increase the bandwidth in either direction without an explicit request for more bandwidth.

16. The IO connector of claim 15, wherein each of the one or more device-side data lanes includes:
one or more IO contacts;
a transmitter coupled to the one or more IO contacts; and
a receiver coupled to the one or more IO contacts.

17. The IO connector of claim 16, wherein the transceiver logic is to selectively activate at least one of the transmitter and the receiver based on the bandwidth configuration command.

18. The IO connector of claim 16, wherein the transceiver logic is to selectively negate one or more signal waves associated with at least one of the transmitter and the receiver based on the bandwidth configuration command.

19. The IO connector of claim 15, further including one or more host-side data lanes having a host-side data rate, wherein the transceiver logic is to match a device-side data rate of the one or more device-side data lanes to the host-side data rate.

20. The IO connector of claim 19, wherein the logic is to,
configure fewer device-side data lanes for operation than host-side data lanes,
serialize data received on the host-side data lanes,
increase a data rate of the serialized data,
deserialize data received on the device-side data lanes, and
decrease a data rate of the deserialized data.

21. The IO connector of claim 20, wherein the transceiver logic is to configure a single device-side data lane for operation.

22. The IO connector of claim 15, further including a plurality of bays, wherein each bay includes one or more device-side data lanes and the logic is to route data directly between two or more of the plurality of bays.

23. The IO connector of claim 15, wherein the transceiver logic is to configure the transmit bandwidth to be greater than the receive bandwidth.

24. The IO connector of claim 15, wherein the transceiver logic is to configure the receive bandwidth to be greater than the transmit bandwidth.

25. The IO connector of claim 15, wherein the transceiver logic is to configure the receive bandwidth to be equal to the transmit bandwidth.

26. The IO connector of claim 15, further including:
a housing;
a semiconductor package, wherein the semiconductor package includes the transceiver logic; and
a substrate coupled to the semiconductor package, wherein the substrate includes the device-side data lanes, and the device-side data lanes are disposed within the housing.

27. A computer implemented method comprising:
issuing a bandwidth configuration command to an input/output (IO) connector including one or more device-side data lanes to communicate with a peripheral device and to define a transmit bandwidth and a receive bandwidth between a mobile host platform having a host-side data rate and the peripheral device having a device-side data rate, wherein the bandwidth configuration command includes a negotiated lane width and direction between the mobile host platform and the peripheral device;

dynamically configuring the transmit bandwidth of the one or more device-side data lanes based on the bandwidth configuration command; and dynamically configuring the receive bandwidth of the one or more device-side data lanes based on the bandwidth configuration command, wherein the bandwidth configuration command is to match the host-side data rate and the device-side data rate, and to automatically increase the bandwidth in either direction without an explicit request for more bandwidth.

28. The method of claim 27, further including selectively activating at least one of a transmitter and a receiver of each device-side data lane based on the bandwidth configuration command.

29. The method of claim 27, further including selectively negating one or more signal waves associated with at least one of a transmitter and a receiver of each device-side data lane based on the bandwidth configuration command.

30. The method of claim 27, further including matching a device-side data rate of one or more device-side data lanes to a host-side data rate of one or more host-side data lanes associated with the IO connector.

31. The method of claim 30, further including:
configuring fewer device-side data lanes for operation than host-side data lanes;
serializing data received on the host-side data lanes;
increasing a data rate of the serialized data;
deserializing data received on the device-side data lanes; and
decreasing a data rate of the deserialized data.

32. The method of claim 31, wherein a single device-side data lane is configured for operation.

33. The method of claim 27, wherein the IO connector further includes a plurality of bays and each bay includes one or more device-side data lanes, the method further including routing data directly between two or more of the plurality of bays.

34. The method of claim 27, further including configuring the transmit bandwidth to be greater than the receive bandwidth.

35. The method of claim 27, further including configuring the receive bandwidth to be greater than the transmit bandwidth.

36. The method of claim 27, further including configuring the receive bandwidth to be equal to the transmit bandwidth.

37. The method of claim 27, further including issuing a lane width negotiation message to the IO connector.

* * * * *